US012706332B2

(12) United States Patent
Li et al.

(10) Patent No.: US 12,706,332 B2
(45) Date of Patent: Aug. 11, 2026

(54) RECYCLING SILICON FROM BATTERIES WITH SILICON-BASED ACTIVE MATERIALS

(71) Applicant: ENEVATE CORPORATION, Irvine, CA (US)

(72) Inventors: Xiang Li, Irvine, CA (US); Heidi Anderson, Newport Beach, CA (US); Benjamin Yong Park, Mission Viejo, CA (US)

(73) Assignee: Enevate Corporation, Irvine, CA (US)

( * ) Notice: Subject to any disclaimer, the term of this patent is extended or adjusted under 35 U.S.C. 154(b) by 868 days.

(21) Appl. No.: 17/829,855

(22) Filed: Jun. 1, 2022

(65) Prior Publication Data

US 2023/0395887 A1 Dec. 7, 2023

(51) Int. Cl.
*H01M 10/54* (2006.01)
*C01B 33/039* (2006.01)
(Continued)

(52) U.S. Cl.
CPC ........... *H01M 10/54* (2013.01); *C01B 33/039* (2013.01); *H01M 4/386* (2013.01); *H01M 2004/027* (2013.01)

(58) Field of Classification Search
CPC ................. H01M 10/54; H01M 4/386; H01M 2004/027; H01M 6/52; C01B 33/039;
(Continued)

(56) References Cited

U.S. PATENT DOCUMENTS 11,242,258 B1 * 2/2022 Ionescu ................... C23C 16/26
2009/0305129 A1 * 12/2009 Fukui .................... H01M 4/134 429/231.95
(Continued)

FOREIGN PATENT DOCUMENTS

CN 112320802 A * 2/2021 ............. C01B 32/05
CN 114227191 A * 3/2022
CN 112207119 B * 9/2022 ............... B09B 3/00

OTHER PUBLICATIONS

English Translation of CN 112320802 A (Year: 2021).*
(Continued)

*Primary Examiner* — Paul A Wartalowicz
*Assistant Examiner* — Slone Elizabeth Simkins
(74) *Attorney, Agent, or Firm* — McAndrews, Held & Mallloy, Ltd.

(57) ABSTRACT

Methods of recycling silicon from lithium-ion batteries having silicon-based electrodes are disclosed. Batteries and methods of manufacturing batteries from the recycled silicon are also disclosed. A method of recycling may include discharging each of one or more batteries to below a threshold voltage and disassembling each of the one or more batteries to collect source material from silicon-based electrodes of the one or more batteries. The source material may include silicon from the silicon-based electrodes. The method may further include rinsing the source material in alcohol to obtain a solution and extracting recycled silicon from the solution by heating the silicon for a first period of time and leaching the silicon in an acid for a second period of time. In some methods, the heating occurs before the leaching. In other embodiments, the leaching occurs before the heating.

25 Claims, 11 Drawing Sheets

(51) Int. Cl.
*H01M 4/02* (2006.01)
*H01M 4/38* (2006.01)

(58) Field of Classification Search
CPC ....... C01B 33/037; C30B 13/00; Y02E 60/10; H01J 9/52; Y02W 30/84
USPC .......................................................... 423/324
See application file for complete search history.

(56) References Cited

U.S. PATENT DOCUMENTS

2013/0295454 A1 11/2013 Huang et al.
2014/0170475 A1 6/2014 Park et al.
2016/0049701 A1* 2/2016 Kepler ...................... C25B 1/14 205/59
2018/0040880 A1* 2/2018 Andersen ............ H01M 4/1395
2018/0198114 A1 7/2018 Bonhomme et al.
2019/0355966 A1 11/2019 Kamath et al.
2020/0220154 A1 7/2020 Xiao et al.
2020/0328482 A1* 10/2020 Ho ........................ H01M 10/54
2020/0358088 A1 11/2020 Lin et al.
2021/0399289 A1* 12/2021 Eshraghi ............. H01M 4/1395
2022/0136079 A1* 5/2022 Wu ................... H01M 10/0525 75/721
2023/0369671 A1* 11/2023 Zheng ..................... H01M 6/52

OTHER PUBLICATIONS

English Translation of CN 112207119 B (Year: 2022).*
English Translation of CN 114227191 A (Year: 2022).*
Specification for PRO U.S. Appl. No. 63/340,612 (Year: 2022).*
National Center for Biotechnology Information (2025). PubChem Compound Summary for CID 8113, Diethanolamine. Retrieved Nov. 6, 2025 from https://pubchem.ncbi.nlm.nih.gov/compound/Diethanolamine. (Year: 2004).*

* cited by examiner

RECYCLING SILICON FROM BATTERIES WITH SILICON-BASED ACTIVE MATERIALS

FIELD

Aspects of the present disclosure relate to recycling. More specifically, certain embodiments of the disclosure are directed to recycling silicon from lithium-ion batteries with one or more electrodes having silicon-based active materials

BACKGROUND

Silicon-based electrodes may provide lithium-ion batteries with a high capacity (e.g., ~3600 mAh/g). Due to such high capacity, extensive development efforts have been expended to develop lithium-ion batteries with electrodes having silicon-based active materials. The raw silicon material used to make such electrodes may undergo multiple treatments. From the perspective of energy saving and environment protection, there is a need for recycling and reusing such silicon from used electrodes.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Batteries with electrodes having silicon-based active materials are substantially shown in and/or described in connection with at least one of the figures, as set forth more completely in the claims. Moreover, processes for recycling silicon from such electrodes are substantially shown in and/or described in connection with at least one of the figures, as set forth more completely in the claims.

Advantages, aspects, and novel features of the present disclosure, as well as details of an illustrated embodiment thereof, will be more fully understood from the following description and drawings.

DETAILED DESCRIPTION

Figure 1:
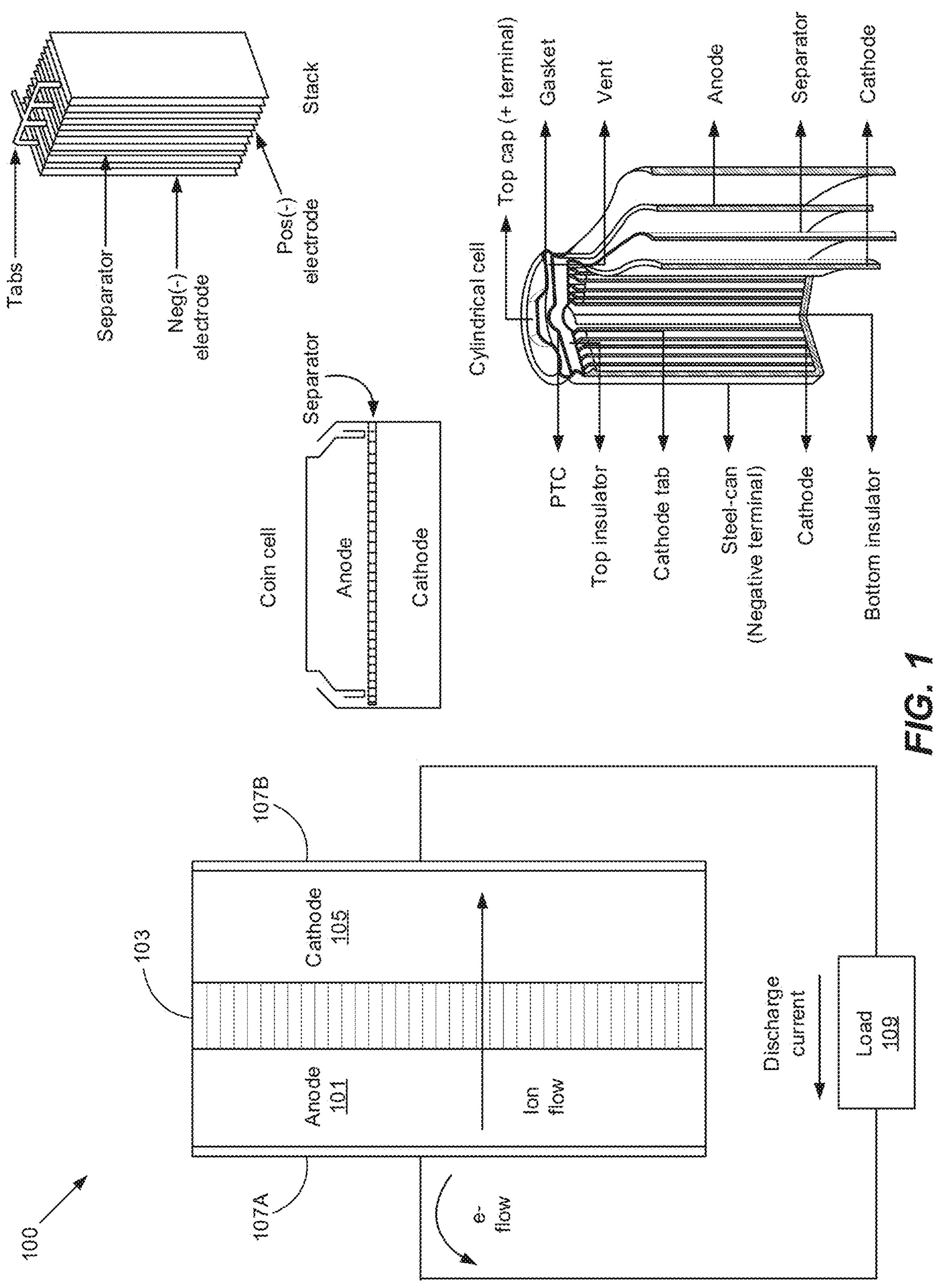
FIG. 1 illustrates batteries in accordance with example embodiments of the disclosure.

FIG. 1 illustrates an example battery. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1 is a very simplified example merely to show the principle of operation of a lithium-ion cell. Examples of realistic structures are shown to the right in FIG. 1, where stacks of electrodes and separators are utilized, with electrode coatings typically on both sides of the current collectors except, in certain cases, the outermost electrodes. The stacks may be formed into different shapes, such as a coin cell, cylindrical cell, prismatic pouch cell, or prismatic metal can cell, for example.

The development of portable electronic devices and electrification of transportation drive the need for high-performance electrochemical energy storage. In devices ranging from small-scale (<100 Wh) to large-scale (>10 kWh), lithium-ion batteries are widely used over other rechargeable battery chemistries due to their advantages in energy density and cyclability.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode 105 are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. In this regard, different methods or processes may be used in forming electrodes, particularly silicon-dominant (>50% in terms of active material by capacity or by weight) anodes. For example, lamination or direct coating may be used in forming a silicon-containing anode (silicon anode). Examples of such processes are illustrated in and described with respect to FIGS. 2 and 3. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$, LiFSI, LiTFSI, etc. In an example scenario, the electrolyte may comprise Lithium hexafluorophosphate ($LiPF_6$) and lithium bis(trifluoromethanesulfonyl)imide (LiTFSI) that may be used together in a variety of electrolyte solvents. Lithium hexafluorophosphate ($LiPF_6$) may be present at a concentration of about 0.1 to 4.0 molar (M) and lithium bis(trifluoromethanesulfonyl)imide (LiTFSI) may be present at a concentration of about 0 to 4.0 molar (M). Solvents may comprise one or more cyclic carbonates, such as ethylene carbonate (EC), fluoroethylene carbonate (FEC), or propylene carbonate (PC) as well as linear carbonates, such as ethyl methyl carbonate (EMC), diethyl carbonate (DEC), and dimethyl carbonate (DMC), in various percentages. In some embodiments, the electrolyte solvents may comprise one or more of EC from about 0-40%, FEC from about 2-40% and/or EMC from about 50-70% by weight.

The separator 103 may be soaked with a liquid or gel electrolyte. In addition, in an example embodiment, the separator 103 does not melt below about 100 to 400° C., and exhibits sufficient mechanical properties for battery applications. A battery, in operation, can experience expansion and contraction of the anode 101 and/or the cathode 105. In an example embodiment, the separator 103 can expand and contract by at least about 5 to 10% without tearing or otherwise failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material and a current collector, such as a copper sheet. Carbon is often used because it has excellent electrochemical properties and is also electrically conductive. Anode electrodes currently used in rechargeable lithium-ion cells typically have a specific capacity of approximately 200 milliamp hours per gram (mAh/g). Graphite, the active material used in most lithium-ion battery anodes, has a theoretical energy density of 372 mAh/g. In comparison, silicon has a high theoretical capacity of 4200 mAh/g. In order to increase volumetric and gravimetric energy density of lithium-ion batteries, silicon may be used as the active material for the cathode 105 or anode 101. Si anodes may be in the form of a composite on a current collector, with >50% Si by capacity or weight in the composite layer.

In an example scenario, the anode 101 and cathode 105 store the ions used for separation of charge, such as lithium ions. In this example, the electrolyte carries positively charged lithium ions from the anode 101 to the cathode 105 in discharge mode, as shown in FIG. 1, and vice versa through the separator 103 in charge mode. The movement of the lithium ions and reactions with the electrodes create free electrons in one electrode which creates a charge at the opposite current collector. The electrical current then flows from the current collector where charge is created through the load 109 to the other current collector. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 through the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density and high power density of lithium-ion batteries are achieved with the development of high-capacity and high-voltage cathodes, high-capacity anodes and electrolytes with high voltage stability and interfacial compatibility with electrodes. Functionally non-flammable or less-flammable electrolytes could be used to improve safety. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be improved by incorporating conductive additives with different morphological properties. Carbon black (Super P), vapor grown carbon fibers (VGCF), and a mixture of the two have previously been incorporated into the anode to improve electrical conductivity and otherwise improve performance. The synergistic interactions between the two carbon materials may facilitate electrical contact throughout the large volume changes of the silicon anode during charge and discharge as well as provide additional mechanical robustness to the electrode and provide mechanical strength (e.g., to keep the electrode material in place). These contact points (especially when utilizing high-aspect-ratio conductive materials) facilitate the electrical contact between anode material and current collector to mitigate the isolation (island formation) of the electrode material while also improving conductivity in between silicon regions. Graphenes and carbon nanotubes may be used because they may show similar benefits. Thus, in some instances, a mixture of two or more of carbon black, vapor grown carbon fibers, graphene, and carbon nanotubes may be used independently or in combinations for the benefits of conductivity and other performance.

State-of-the-art lithium-ion batteries typically employ a graphite-dominant anode which is a lithium intercalation type anode. Silicon-dominant anodes, however, offer improvements compared to graphite-dominant Li-ion batteries. Silicon exhibits both higher gravimetric (4200 mAh/g vs. 372 mAh/g for graphite) and volumetric capacities (2194 mAh/L vs. 890 mAh/L for graphite). In addition, Si has a higher redox reaction potential versus Li compared to graphite, with a voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life. Therefore, silicon anodes require a strong conductive matrix that (a) holds silicon particles together in the anode, (b) is flexible enough to accommodate the large volume expansion and contraction of silicon, and (c) allows a fast conduction of electrons within the matrix.

Therefore, there is a trade-off among the functions of active materials, conductive additives and polymer binders. The balance may be adversely impacted by high energy density silicon anodes with low conductivity and huge volume variations described above. Polymer binder(s) may be pyrolyzed to create a pyrolytic carbon matrix with embedded silicon particles. In addition, the polymers may be selected from polymers that are completely or partially soluble in water or other environmentally benign solvents or mixtures and combinations thereof. Polymer suspensions of materials that are non-soluble in water could also be utilized.

In some embodiments, dedicated systems and/or software may be used to control and manage batteries or packs thereof. In this regard, such dedicated systems may comprise suitable circuitry for running and/or executing control and manage related functions or operations. Further, such software may run on suitable circuitry, such as on processing circuitry (e.g., general processing units) already present in the systems or it may be implemented on dedicated hardware. For example, battery packs (e.g., those used in electric vehicles) may be equipped with a battery management system (BMS) for managing the batteries (or packs) and operations. An example battery management system (BMS) is illustrated in and described in more detail with respect to FIG. 4.

Figure 2:
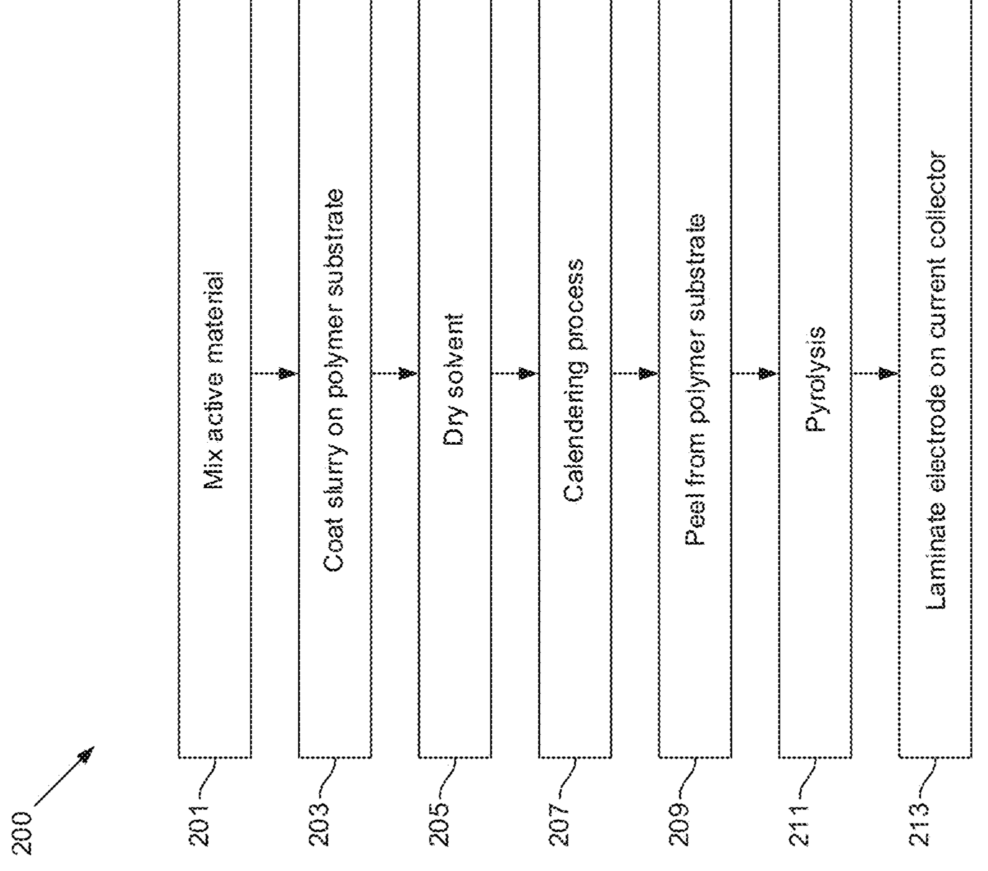
FIG. 2 presents a flow diagram of an example lamination process for forming an electrode of a battery of FIG. 1.

FIG. 2 is a flow diagram of an example lamination process for forming a silicon-dominant anode cell. This process employs a high-temperature pyrolysis process on a substrate, layer removal, and a lamination process to adhere the active material layer to a current collector. This strategy may also be adopted by other types of anodes, such as graphite, conversion type anodes, such as transition metal oxides, transition metal phosphides, and other alloy type anodes, such as Sn, Sb, Al, P, etc.

To fabricate an anode, the raw electrode active material is mixed in step 201. In the mixing process, the active material may be mixed with a binder/resin (such as water soluble PI (polyimide), PAI (polyamideimide), carboxymethyl cellulose (CMC), styrene-butadiene rubber (SBR), poly(acrylic acid) (PAA), Sodium Alginate, Phenolic or other water soluble resins and mixtures and combinations thereof), solvent, rheology modifiers, surfactants, pH modifiers, and conductive additives. The materials may comprise carbon nanotubes/fibers, graphene sheets, metal polymers, metals, semiconductors, and/or metal oxides, for example. Silicon powder may then be dispersed in polyamic acid resin, PAI, or PI (15-25% solids in N-Methyl pyrrolidone (NMP) or deionized (DI) water) at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%. Such silicon powder may have a median particle diameter, median particle size, or D50 of about 1-30 μm, 2-15 μm, or 5-30 μm. The pH of the slurry can be varied from acidic to basic, which may be beneficial for controlling the solubility, conformation, or adhesion behavior of water soluble polyelectrolytes, such as polyamic acid, carboxymethyl cellulose, or polyacrylic acid. Ionic or non-ionic surfactants may be added to facilitate the wetting of the insoluble components of the slurry or the substrates used for coating processes. The particle size and mixing times may be varied to configure the electrode coating layer density and/or roughness.

Furthermore, cathode electrode coating layers may be mixed in step 201, and coated (e.g., onto aluminum), where the electrode coating layer may comprise cathode material mixed with carbon precursor and additive as described above for the anode electrode coating layer. The cathode material may comprise Lithium Nickel Cobalt Manganese Oxide (NMC (also called NCM): $LiNi_xCo_yMn_zO_2$, x+y+z=1), Lithium Iron Phosphate (LFP: $LiFePO_4$/C), Lithium Nickel Manganese Spinel (LNMO: e.g. $LiNi_{0.5}Mn_{1.5}O_4$), Lithium Nickel Cobalt Aluminum Oxide (NCA: $LiNi_aCo_bAl_cO_2$, a+b+c=1), Lithium Manganese Oxide (LMO: e.g. $LiMn_2O_4$), a quaternary system of Lithium Nickel Cobalt Manganese Aluminum Oxide (NCMA: e.g. $Li[Ni_{0.89}Co_{0.05}Mn_{0.05}Al_{0.01}]O_2$, Lithium Cobalt Oxide (LCO: e.g. $LiCoO_2$), and other Li-rich layer cathodes or similar materials, or combinations thereof. The particle size and mixing times may be varied to configure the electrode coating layer density and/or roughness.

In step 203, the slurry may be coated on a substrate. In this step, the slurry may be coated onto a polyester, polyethylene terephthalate (PET), or Mylar film at a loading of, e.g., 2-4 mg/cm$^2$ and then undergo drying in step 205 to an anode coupon with high Si content and less than 15% residual solvent content. This may be followed by an optional calendering process in step 207, where a series of hard pressure rollers may be used to finish the film/substrate into a smoothed and denser sheet of material.

In step 209, the active-material-containing film may then be removed from the PET, where the active material layer may be peeled off the polymer substrate. The peeling may be followed by a pyrolysis step 211 where the material may be heated to, e.g., 600-1250° C. for 1-3 hours, cut into sheets, and vacuum dried using a two-stage process (120° C. for 15 h, 220° C. for 5 h). The peeling process may be skipped if polypropylene (PP) substrate is used, and PP can leave ~2% char residue upon pyrolysis.

In step 213, the electrode material may be laminated on a current collector. For example, a 5-20 μm thick copper foil may be coated with polyamide-imide with a nominal loading of, e.g., 0.2-0.6 mg/cm$^2$ (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

The cell may be assessed before being subject to a formation process. The measurements may comprise impedance values, open circuit voltage, and electrode and cell thickness measurements. The formation cycles are defined as any type of charge/discharge of the cell that is performed to prepare the cell for general cycling and is considered part of the cell production process. Different rates of charge and discharge may be utilized in formation steps. During formation, the initial lithiation of the anode may be performed, followed by delithiation. Cells may be clamped during formation and/or cycling.

Figure 3:
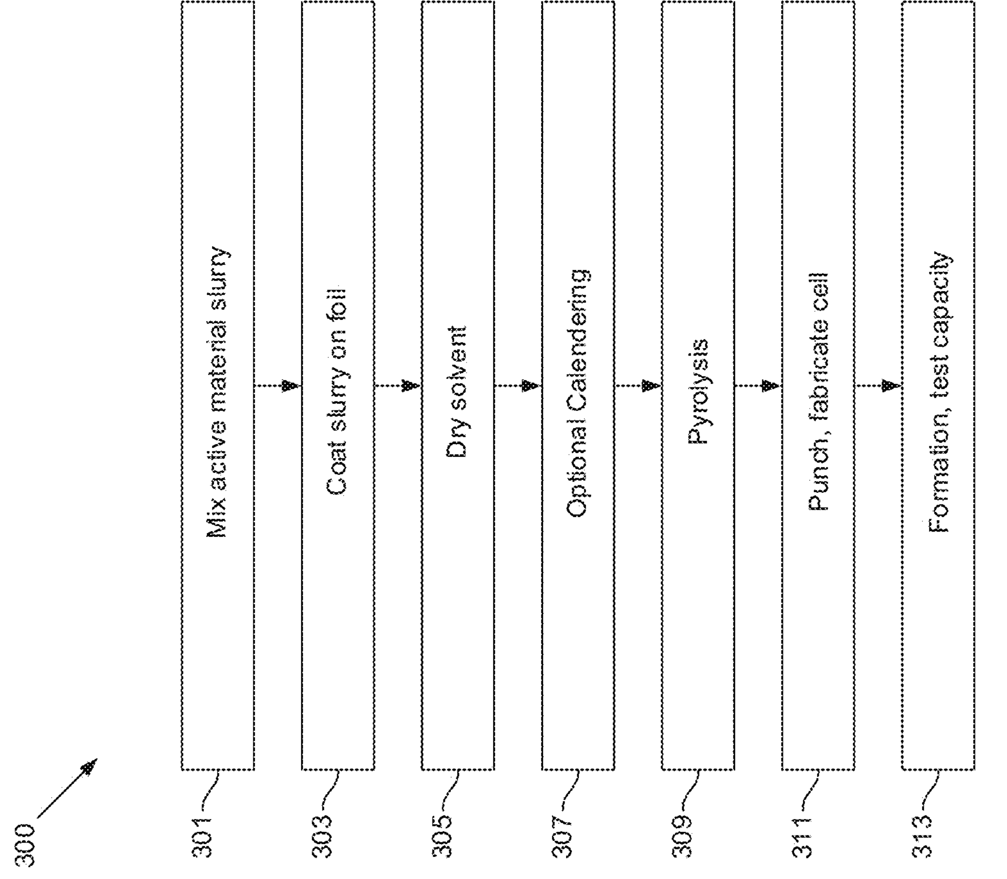
FIG. 3 presents a flow diagram of a direct coating process for forming an electrode of a battery of FIG. 1.

FIG. 3 is a flow diagram of a direct coating process for forming a silicon-dominant anode cell, in accordance with an example embodiment of the disclosure. This process comprises physically mixing the active material, conductive additive, and binder together, and coating the mixed slurry directly on a current collector before pyrolysis. This example process comprises a direct coating process in which an anode or cathode slurry is directly coated on a copper foil using a binder such as CMC, SBR, PAA, Sodium Alginate, PAI, PI and mixtures and combinations thereof.

In step 301, the active material may be mixed with, e.g., a binder/resin (such as PI, PAI or phenolic), solvent (such as NMP, water, other environmentally benign solvents or their mixtures and combinations thereof), and conductive additives. The materials may comprise carbon nanotubes/fibers, graphene sheets, metal polymers, metals, semiconductors, and/or metal oxides, for example. Silicon powder with a 1-30 μm particle size, for example, may then be dispersed in polyamic acid resin, PAI, PI (15% solids in DI water or N-Methyl pyrrolidone (NMP)) at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%.

Furthermore, cathode active materials may be mixed in step 301, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 303, the slurry may be coated on a copper foil. In the direct coating process described here, an anode slurry is coated on a current collector with residual solvent followed by a drying and a calendering process for densification. A pyrolysis step (~500-800° C.) is then applied such that carbon precursors are partially or completely converted into glassy carbon or pyrolytic carbon. Similarly, cathode active materials may be coated on a foil material, such as aluminum, for example. The active material layer may undergo a drying process in step 305 to reduce residual solvent content. An optional calendering process may be utilized in step 307 where a series of hard pressure rollers may be used to finish the film/substrate into a smoother and denser sheet of material. In step 307, the foil and coating optionally proceeds through a roll press for calendering where the surface is smoothed out and the thickness is controlled to be thinner and/or more uniform.

In step 309, the active material may be pyrolyzed by heating to 500-1000° C. such that carbon precursors are partially or completely converted into glassy carbon. Pyrolysis can be done either in roll form or after punching. If the electrode is pyrolyzed in a roll form, it will be punched into individual sheets after pyrolysis. The pyrolysis step may result in an anode active material having silicon content greater than or equal to 50% by capacity or by weight. In an example scenario, the anode active material layer may comprise 20 to 95% silicon. In another example scenario may comprise 50 to 95% silicon by weight. In instances where the current collector foil is not pre-punched/pre-perforated, the formed electrode may be perforated with a punching roller, for example. The punched anodes may then be used to assemble a cell with cathode, separator and electrolyte materials. In some instances, separator with significant adhesive properties may be utilized.

In step 313, the cell may be assessed before being subject to a formation process. The measurements may comprise impedance values, open circuit voltage, and cell and/or electrode thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in formation steps.

Figure 4:
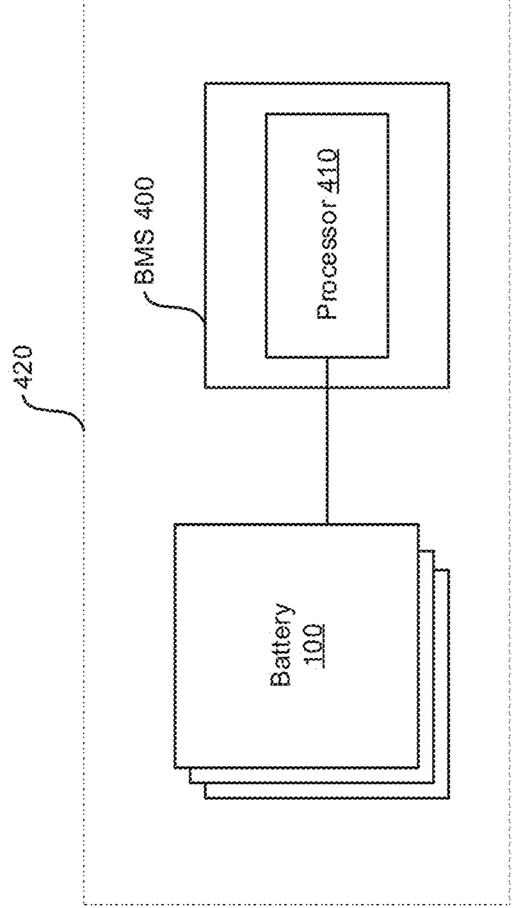
FIG. 4 illustrates an example battery management system (BMS) for use in managing operation of one or more batteries of FIG. 1.

FIG. 4 illustrates an example battery management system (BMS) for use in managing operation of batteries. Shown in FIG. 4 is battery management system (BMS) 400.

The battery management system (BMS) 400 may comprise suitable circuitry (e.g., processor 410) configured to manage one or more batteries (e.g., each being an instance of the battery 100 as described with respect with FIG. 1). In this regard, the BMS 400 may be in communication and/or coupled with each battery 100. In some implementations, a separate processor (e.g., a conventional processor, such as an electronic control unit (ECU), a microcontroller unit (ECU), or the like), or several such separate processors, may be used, and may be configured to handle algorithms or control functions with regards to the batteries. In such implementations, such processor(s) may be connected to the batteries, such as through the processor 410, and thus may be treated as part of the BMS 400 and acting as part of processor 410.

In some embodiments, the battery 100 and the BMS 400 may be in communication and/or coupled with each other, for example, via electronics or wireless communication. In some embodiments, the BMS 400 may be incorporated into the battery 100. Alternatively, in some embodiments, the BMS 400 and the battery 100 may be combined into a common package 420. Further, in some embodiments, the BMS 400 and the battery 100 may be separate devices/components, and may only be in communication with one another when present in the same system. The disclosure is not limited to any particular arrangement, however.

Figure 5:
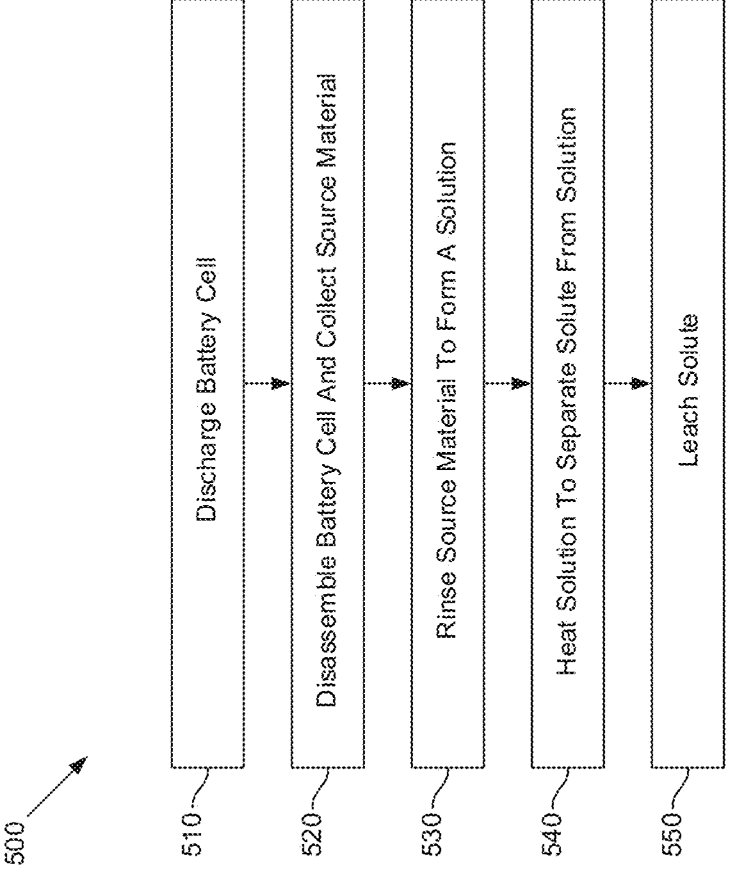
FIG. 5 presents a flow diagram of a first example process for recycling silicon from electrodes of the batteries of FIG. 1.

FIG. 5 is a flow diagram of a first process 500 for recycling silicon from electrodes of lithium-ion batteries, in accordance with an example embodiment of the disclosure. The process 500 may be used to recycle silicon from different types of used batteries, which have reached end of life. Moreover, the used batteries may have been subjected to various cycling conditions and protocols. In general, the process 500 comprises mechanical separation, solvent wash, thermal heating, and acid leaching processes. In particular, the process 500 subjects silicon reclaimed from electrodes to a heat treatment before subjecting the silicon to acid leaching.

A second process 600 for recycling silicon from electrodes of lithium-ion batteries is described below. The process 600 is similar to the process 500. However, the process 600 subjects silicon reclaimed from electrodes to acid leaching before subjecting the silicon to a heat treatment. Regardless, the process 500 and the process 600 both result in recycled silicon, which is suitable for subsequent manufacture of electrodes per either the laminating process 200 of FIG. 2 or the direct coating process 300 of FIG. 3.

As shown, the process 500 includes discharging at 510 one or more batteries such as one or more lithium-ion batteries. In particular, the batteries may be discharged so as to lower the stored electrical potential toward 0 volts (V). Such discharging of the batteries may reduce potential harm to persons and/or equipment during subsequent disassembly of the batteries. In some embodiments, the batteries may be discharged down to an absolute potential level of 2V or less.

After discharging the batteries, the batteries may be disassembled at 520 so as to collect source material from electrodes (e.g., anodes) of the discharged batteries. In particular, the source material may include at least portions of the silicon-based active material layer of the electrodes. In some embodiments, the source material comprises at least 25%, at least 50%, 20 to 95%, or 50 to 90% silicon by capacity or by weight of which portions may include crystalline silicon and/or lithiated silicon. Besides silicon, the collected source material may also include lithium (e.g., from the electrolyte); copper or other metals (e.g., from the current collector); and/or carbon, binder, or other materials (e.g., from the active material layer). As part of this disassembly, other constituent aspects of the battery such as current collectors, cathodes, electrolytes, battery housings, etc. may be reclaimed and/or gathered for further recycling and/or disposal processes.

At 530, the collected source material may be rinsed in a solvent such as an alcohol. In various embodiments, the source material may be rinsed in methanol for 1 hour. Various embodiments may utilize other solvents such as water, ethanol, another acid, or other solvent that reacts with or otherwise dissolves the silicon in the collected source material to form a solution comprising silicon and other solutes. In some embodiments, the silicon may include lithiated silicon due to its use in a lithium-ion battery.

After the solvent rinse, the solution may be subjected to a heat treatment at 540. More specifically, the solution may be subjected to a temperature of 300-700° C., 400-600° C., or about 500° C. in ambient air for 5 hours. Such heating may cause the solution to evaporate to dryness, thus leaving behind the silicon and other solutes. Such heating may further cause calcination or oxidation of at least portions of the silicon and/or other solutes. In particular, the heat treatment may raise the temperature of the silicon without melting, which may remove impurities or volatile substances. In some embodiments, the heat treatment may be performed in the presence of oxygen or another oxidizing gas instead of ambient air.

After the heat treatment, the silicon may be subjected to acid leaching at 550. In particular, the silicon may be subjected to 10 wt % nitric acid ($HNO_3$) leaching for 8 hours. In other embodiments, the silicon may be subject to 10 wt % nitric acid leaching for 12 hours. In various embodiments, the acid leaching may use another acid such as aqua regia, concentrated sulfuric acid ($H_2SO_4$) only, sulfuric acid diluted with peroxide ($H_2O_2$), or another preferably strong acid and/or an oxidant.

The recycled silicon of process 500 may exhibit various capacities. In particular, the recycled silicon of process 500 may have a capacity of at least 1500 mAh/g, at least 2000 mAh/g, at least 2500 mAh/g, or at least 3000 mAh/g.

Figure 6:
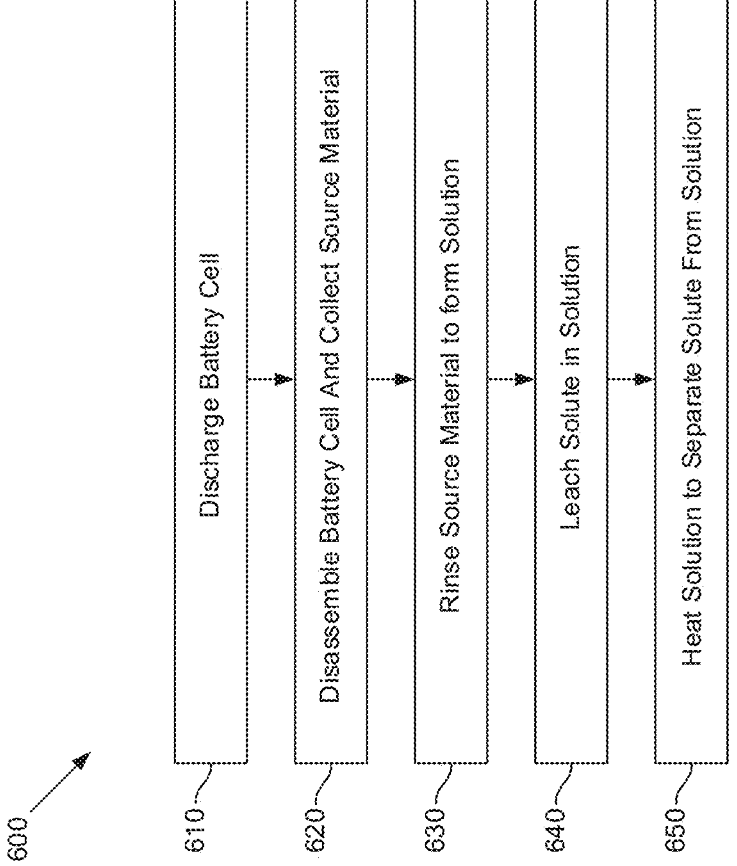
FIG. 6 presents a flow diagram of a second example process for recycling silicon from electrodes of the batteries of FIG. 1

Referring now to FIG. 6, the silicon recycling process 600 will be described, in which acid leaching of silicon occurs before heating treatment of the silicon.

As shown, the process 600 includes discharging at 610 one or more batteries such as one or more lithium-ion batteries. In particular, the batteries may be discharged so as to lower the stored electrical potential toward 0 volts (V). Such discharging of the batteries may reduce potential harm to persons and/or equipment during subsequent disassembly of the batteries. In some embodiments, the batteries may be discharged down to an absolute potential level of 2V or less.

After discharging the batteries, the batteries may be disassembled at 620 so as to collect source material from electrodes (e.g., anodes) of the discharged batteries. In particular, the source material may include at least portions of the silicon-based active material layer of the electrodes. In some embodiments, the source material comprises at least 25%, at least 50%, 20 to 95%, or 50 to 90% silicon by capacity or by weight of which portions may include crystalline silicon and/or lithiated silicon. Besides silicon, the collected source material may also include lithium (e.g., from the electrolyte); copper or other metals (e.g., from the current collector); and/or carbon, binder, or other materials (e.g., from the active material layer). As part of this disassembly, other constituent aspects of the battery such as current collectors, cathodes, electrolytes, battery housings, etc. may be reclaimed and/or gathered for further recycling and/or disposal processes.

At 630, the collected source material may be rinsed in a solvent such as an alcohol. In various embodiments, the source material may be rinsed in methanol for 1 hour. Various embodiments may utilize other solvents such as water, ethanol, another acid, or other solvent that reacts with or otherwise dissolves the silicon in the collected source material to form a solution comprising silicon and other solutes. In some embodiments, the silicon may include lithiated silicon due to its use in a lithium-ion battery.

After the solvent rinse, the solution may be subjected to acid leaching at 640. In particular, the silicon may be subjected to 10 wt % nitric acid leaching for 8 hours. In other embodiments, the silicon may be subjected to 10 wt % nitric acid leaching for 12 hours. In various embodiments, the acid leaching may use another acid such as aqua regia, concentrated sulfuric acid ($H_2SO_4$) only, sulfuric acid diluted with peroxide ($H_2O_2$), or another preferably strong acid and/or an oxidant.

After the acid leaching, the silicon may be subjected to a heat treatment at 650. More specifically, the solution may be subjected to a temperature of 300-700° C., 400-600° C., or about 500° C. in ambient air for 5 hours. Such heating may cause the solution to evaporate to dryness, thus leaving behind the silicon and other solutes. Such heating may further cause calcination or oxidation of at least portions of the silicon and/or other solutes. In particular, the heat treatment may raise the temperature of the silicon without melting, which may remove impurities or volatile substances. In some embodiments, the heat treatment may be performed in the presence of oxygen or another oxidizing gas instead of ambient air.

Similar to process 500, the recycled silicon of process 600 may exhibit various capacities. In particular, the recycled silicon of process 600 may have a capacity of at least 1500 mAh/g, at least 2000 mAh/g, at least 2500 mAh/g, or at least 3000 mAh/g.

As noted above, the process 500 subjects the silicon to heat treatment before subjecting the silicon to acid leaching. Conversely, the process 600 subjects the silicon to acid leaching before subjecting the silicon to heat treatment. While both processes may recycle silicon that is suitable for subsequent manufacturing of electrodes via processes 200 and 300, the processes 500, 600 may result in recycled silicon that deliver different electrochemical performance. To aid in distinguishing the silicon resulting from the process 500 from the silicon resulting from the process 600, the silicon resulting from process 500 is referred to hereafter as "Si-1" and the silicon resulting from the process 600 is referred to hereafter as "Si-2."

Figure 7B:
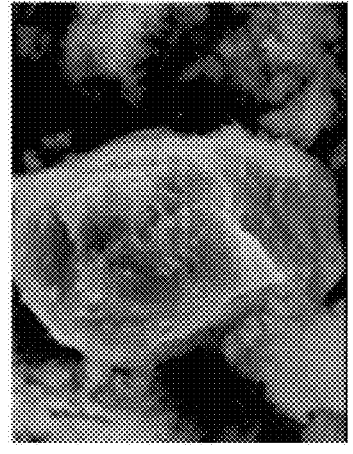
FIG. 7B provides an SEM image of material recycled per the process of FIG. 5, but at high magnification than FIG. 7A.
Figure 7D:
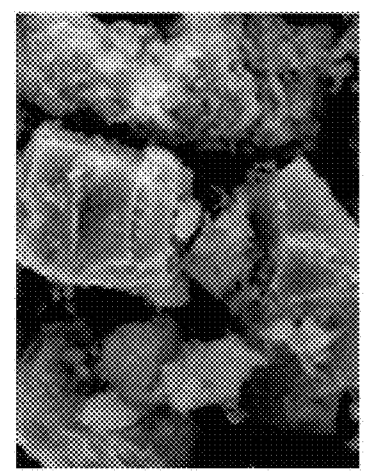
FIG. 7D provides an SEM image of material recycled per the process of FIG. 6, but at high magnification than FIG. 7C.
Figure 7A:
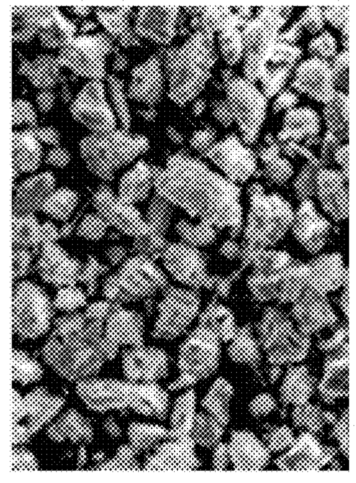
FIG. 7A provides a scanning electron microscope (SEM) image of material recycled per the process of FIG. 5.
Figure 7C:
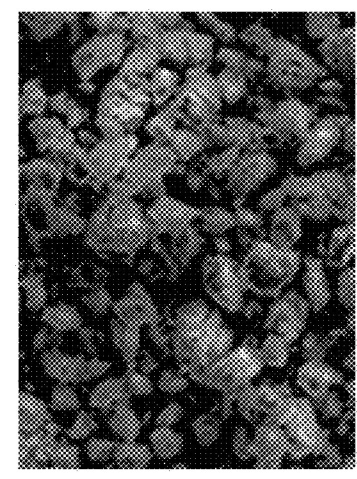
FIG. 7C provides an SEM image of material recycled per the process of FIG. 6.

FIGS. 7A and 7B each provide a scanning electron microscope (SEM) image of Si-1, with the SEM image of FIG. 7B at greater magnification than the SEM image of FIG. 7A. Similarly, FIGS. 7C and 7D each provide a SEM image of Si-2, with the SEM image of FIG. 7D at greater magnification than the image of FIG. 7C. As shown, Si-1 and Si-2 in various embodiments may have a similar D50 particle size of about 1-30 μm, 2-15 μm, or 5-30 μm. However, the images of FIGS. 7A-7D depict that Si-2 is more amorphous than Si-1. In addition, Si-2 is depicted as including both relatively large Si chunks and amorphous Si. While not bound by theory, the relatively large Si chunks are possibly from uncycled crystalline Si and amorphous Si is possibly from deeply-cycled Si.

Figures 8A, 8B, 8C, 8D, 8E, 8F:
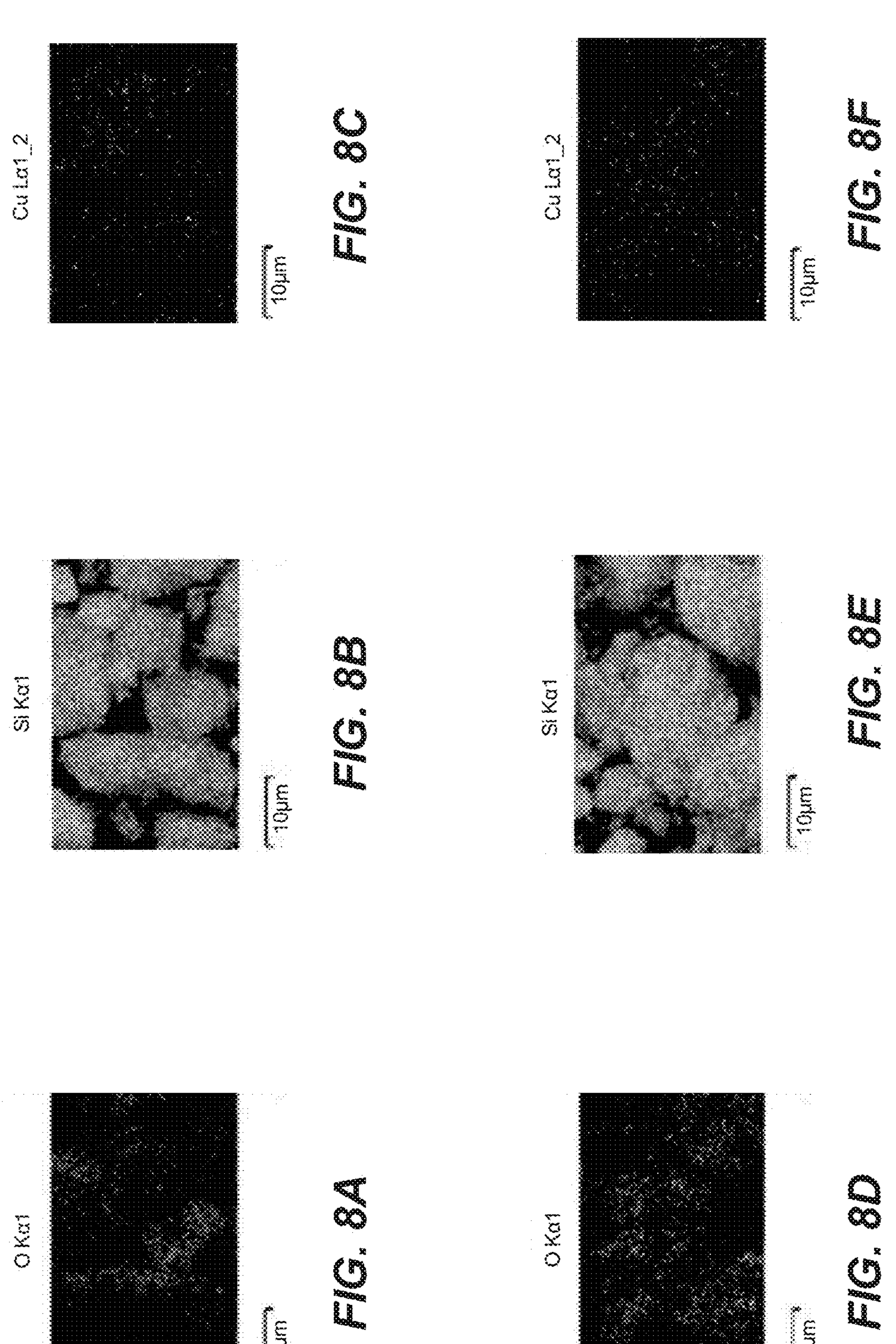
FIG. 8A provides an energy-dispersive spectroscopy (EDS) mapping of oxygen for material recycled per the process of FIG. 5.
FIG. 8B provides an EDS mapping of silicon for material recycled per the process of FIG. 5.
FIG. 8C provides an EDS mapping of copper for material recycled per the process of FIG. 5.
FIG. 8D provides an EDS mapping of oxygen for material recycled per the process of FIG. 6.
FIG. 8E provides an EDS mapping of silicon for material recycled per the process of FIG. 6.
FIG. 8F provides an EDS mapping of copper for material recycled per the process of FIG. 6.

Referring now to FIGS. 8A-8F, elemental analysis of Si-1 and Si-2 is provided. In particular, FIG. 8A provides an energy-dispersive spectroscopy (EDS) mapping of the oxygen (O) of Si-1. Similarly, FIG. FIG. 8D provides an EDS mapping of the oxygen (O) of Si-2. As shown, both Si-1 and Si-2 provide a uniform oxides layer, which is due to oxidation reactions between Si and $H_2O$.

FIG. 8B provides an EDS mapping of the silicon (Si) of Si-1. Similarly, FIG. 8E provides an EDS mapping of the silicon (Si) of Si-2. As is apparent from FIGS. 8B, 8E, silicon (Si) is the dominant element after the recycling process.

FIG. 8C provides an EDS mapping of the copper (Cu) of Si-1. Similarly, FIG. 8F provides an EDS mapping of the copper (Cu) of Si-2. Per FIGS. 8C, 8E, Si-1 comprises a higher content of copper than Si-2, indicating possible Si—Cu compounds on the surface.

Figure 9:
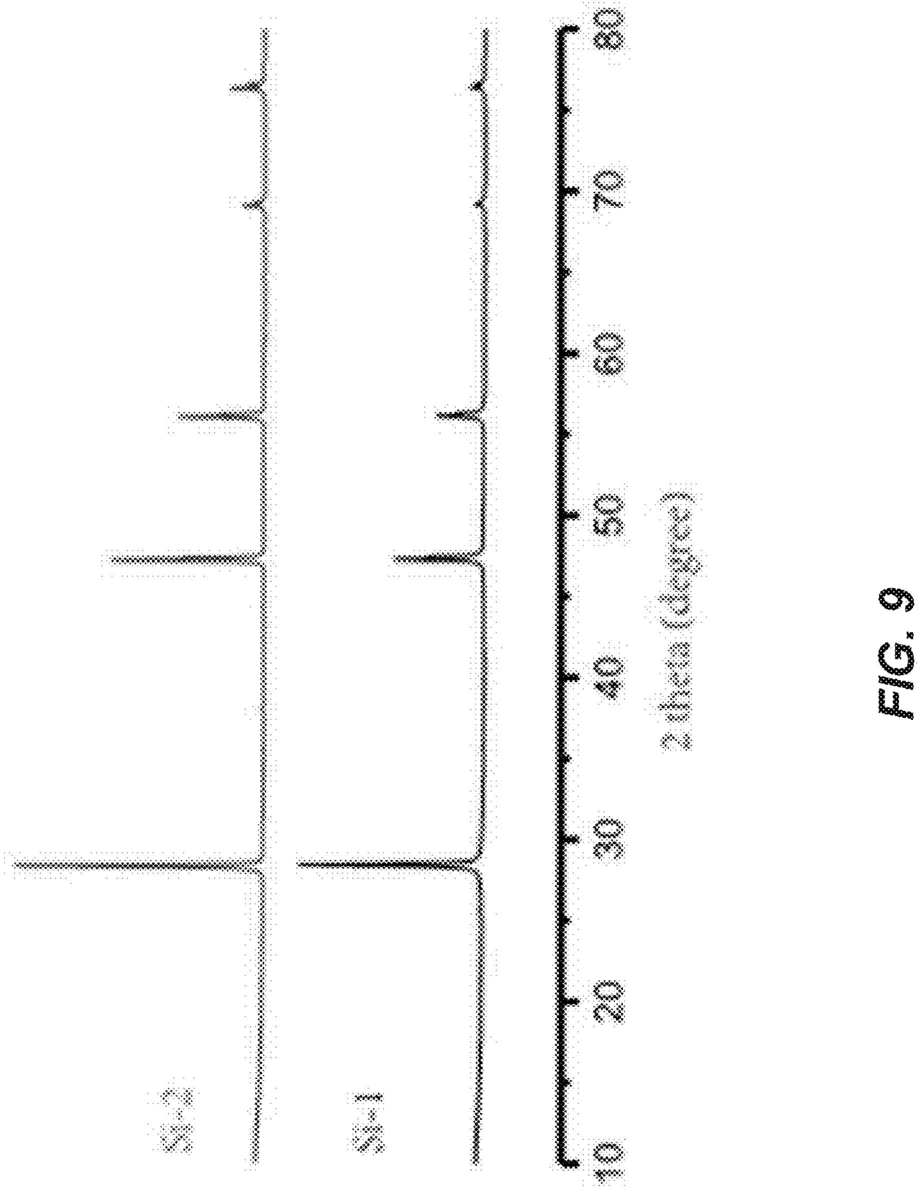
FIG. 9 depicts X-Ray Diffraction Patterns (XDP) for material recycled per the process of FIG. 5 and for material recycled per the process of FIG. 6.

Referring now to FIG. 9, X-Ray Diffraction Patterns (XDP) for Si-1 and Si-2 are shown. In particular, the upper pattern corresponds to Si-2 and the lower pattern corresponds to Si-1. The patterns depicts the highly-crystalline features of both Si-1 and Si-2. The major phase depicted by the patterns is from crystalline silicon (Si). However, Si-1 shows a slightly narrower line shape than Si-2, indicating higher crystallinity, which aligns with the SEM images of FIGS. 7A-7D.

Figure 10A:
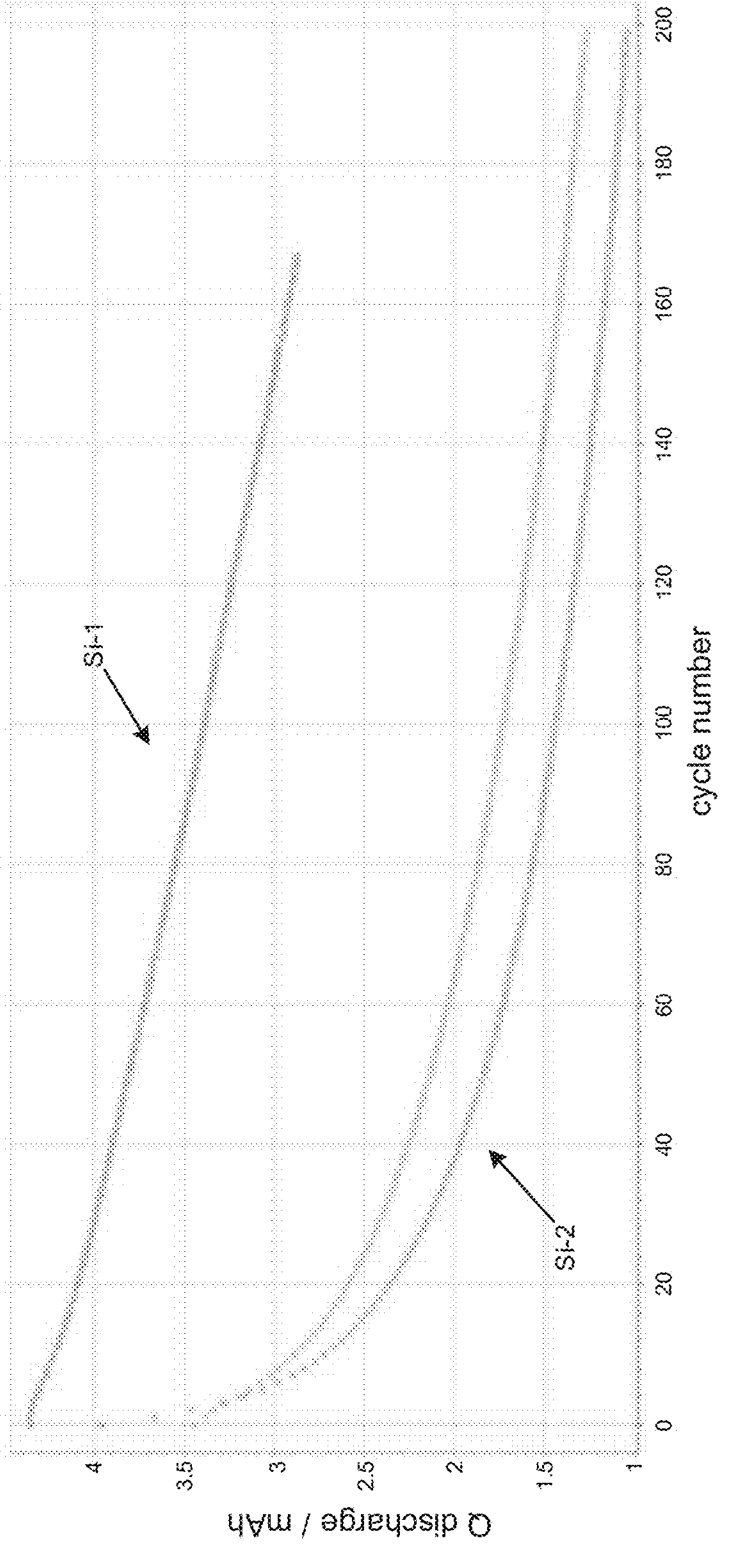
FIG. 10A depicts 2C cycling performance of a battery manufactured from material recycled per the process of FIG. 5 and a battery manufactured from material recycled per the process of FIG. 6.
Figure 10B:
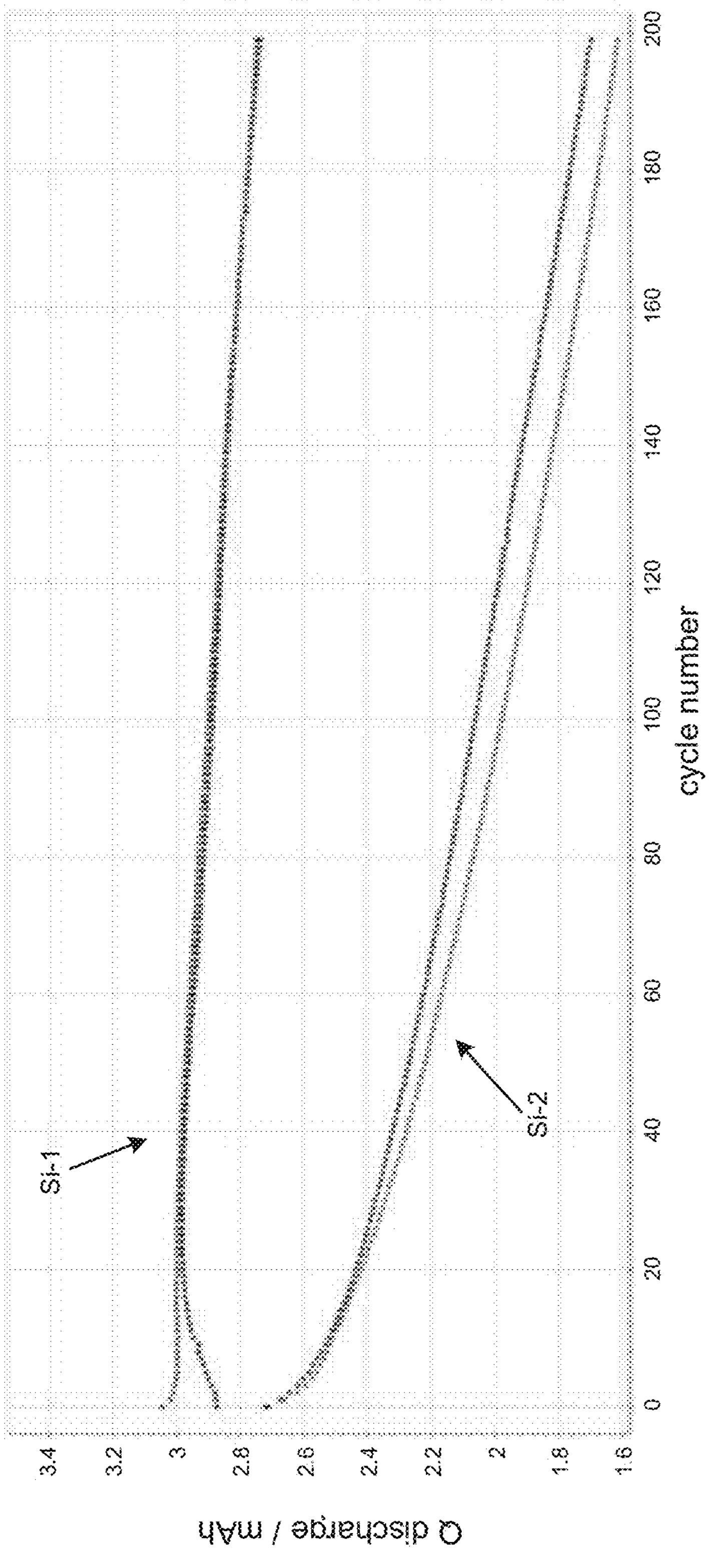
FIG. 10B depicts 4C cycling performance of a battery manufactured from material recycled per the process of FIG. 5 and a battery manufactured from material recycled per the process of FIG. 6.

Referring now to FIGS. 10A and 10B, 2C cycling performance and 4C cycling performance of example lithium-ion batteries are respectively depicted. In particular, 2C and 4C cycling performance tests were applied on example lithium-ion batteries. The example lithium-ion batteries were full coin cells comprising NCM811 cathodes and anodes with active materials formed from either Si-1 or Si-2. The cycling protocols for the 2C and 4C cycling of the Si-1 battery and Si-2 battery are presented below in Table 1 and Table 2, respectively. As can be seen from FIGS. 10A and 10B, Si-1 delivers a lithium-ion battery with higher capacity and better cyclability than Si-2. While not being bound by theory, the higher crystallinity of Si-1 may explain the performance difference between the Si-1 battery and the Si-2 battery.

TABLE 1

| 2 C Cycling Protocol | |
|---|---|
| step | |
| | Formation |
| 1 | Charge at 1 C to 4.1 V until 0.05 C, discharge at 1 C to 2 V until 0.2 C |
| 2 | Charge at 1 C to 3.3 V until 0.05 C, rest 10 minutes |
| | 2 C test |
| 3 | Rest 1 minute, Charge at 0.33 C to 4.1 V until 0.05 C, rest 5 minutes, discharge at 0.33 C to 2.75 V, rest 5 minutes |
| 4 | Rest 1 minute, Charge at 2 C to 4.1 V until 0.05 C, rest 5 minutes, discharge at 0.5 C to 2.75 V, rest 5 minutes |
| 5 | The following cycles are the same as step 4 of the 2 C test |

TABLE 2

| 4 C Cycling Protocol | |
|---|---|
| step | |
| | Formation |
| 1 | Charge at 1 C to 4.1 V until 0.05 C, discharge at 1 C to 2 V until 0.2 C |
| 2 | Charge at 1 C to 3.3 V until 0.05 C, rest 10 minutes |
| | 4 C test |
| 3 | Rest 1 minute, Charge at 0.33 C to 4.1 V until 0.05 C, rest 5 minutes, discharge at 0.33 C to 3 V, rest 5 minutes |
| 4 | Rest 1 minute, Charge at 4 C to 4.1 V until 0.05 C, rest 5 minutes, discharge at 0.5 C to 3.2 V, rest 5 minutes |
| 5 | The following cycles are the same as step 4 of the 4 C test |

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:

providing a source material that includes active material from one or more battery electrodes;

rinsing the source material in alcohol to place silicon particles from the active material of the one or more electrodes into a solution;

heating the solution and the silicon particles therein for a first period of time, wherein the heating evaporates the solution and leaves behind the silicon particles;

leaching the silicon particles in an acid for a second period of time; and after the evaporating the solution and the leaching the silicon particles, reclaiming the silicon particles as recycled silicon particles.

2. The method of claim 1, wherein the leaching the silicon particles occurs after the heating the solution and the silicon particles.

3. The method of claim 1, wherein, prior to the heating the solution and the silicon particles, the leaching the silicon particles comprises subjecting the solution to the acid for the second period of time.

4. The method of claim 1, wherein the heating the solution and the silicon particles comprises heating the silicon particles in an oxygen environment at a temperature sufficient to cause oxidation of at least portions of the silicon particles.

5. The method of claim 1, wherein the heating the silicon particles comprises heating the silicon particles in ambient air at a temperature sufficient to cause oxidation of at least portions of the silicon particles.

6. The method of claim 1, wherein the acid comprises nitric acid.

7. The method of claim 1, wherein the leaching the silicon particles comprises leaching the silicon particles in 10 wt % nitric acid for at least 8 hours.

8. The method of claim 1, wherein the leaching the silicon particles comprises leaching the silicon particles in 10 wt % nitric acid for at least 12 hours.

9. The method of claim 1, wherein the source material comprises at least 25 wt % silicon particles prior to the rinsing.

10. The method of claim 1, wherein the source material comprises at least 50 wt % silicon particles prior to the rinsing.

11. The method of claim 1, wherein the source material comprises lithium.

12. The method of claim 1, wherein the source material comprises copper.

13. The method of claim 1, wherein the source material comprises crystalline silicon particles.

14. The method of claim 1, wherein the alcohol comprises methanol.

15. The method of claim 1, comprising forming an anode with an active material layer comprising the recycled silicon particles.

16. The method of claim 1, comprising:

forming a battery comprising an anode with an active material layer; and wherein the active material layer comprises the recycled silicon particles.

17. The method of claim 16, wherein the battery retains at least 80% of its storage capacity after at least 100 cycles at 4 C.

18. The method of claim 1, wherein the recycled silicon particles have a capacity of at least 1500 mAh/g.

19. The method of claim 1, wherein the recycled silicon particles have a capacity of at least 2000 mAh/g.

20. The method of claim 1, wherein the recycled silicon particles have a capacity of at least 2500 mAh/g.

21. The method of claim 1, wherein the recycled silicon particles have a capacity of at least 3000 mAh/g.

22. The method of claim 1, wherein the recycled silicon particles have a median particle size between 2 μm and 15 μm inclusive.

23. The method of claim 1, comprising:

discharging one or more batteries to below a threshold voltage; and disassembling the one or more batteries to collect the source material from silicon-based electrodes of the one or more batteries.

24. The method of claim 1, comprising:

discharging one or more batteries below 2 V; and disassembling the one or more batteries to collect the source material from silicon-based electrodes of the one or more batteries.

25. The method of claim 1, wherein the heating the solution and the silicon particles comprises subjecting the solution and the silicon particles to a temperature of 300-700° C.

* * * * *